(12) United States Patent
Van Duzer

(10) Patent No.: X1958
(45) Date of Patent: Jun. 30, 1813

(54) FLAX & HEMP MACHINE

(76) Inventor: William Van Duzer

William Van [illegible]

Letters Patent

The Schedule referred to in these Letters Patent, and making part of the same con-
taining a description in the words of the said William Van [illegible] himself of
his Machine for breaking Hemp and Flax.

This Machine consists of two large
wooden upright posts from eight to ten feet in length each must be at-
tached to and Combined with other timbers braces so as to form a [illegible]
[illegible] frame resembling that of a Saw Mill in which the saw gate
slides, said frame is to be in the clear from eight to ten feet high and from
four to seven feet wide or any other size that may be found more convenient
about one third of the distance from the bottom to the top of these [illegible]
two or more slats or breakers framed in horizontally across the frame [illegible]
wider at one end than the other in likeness to the lower slats of the common
hemp brake, another frame must be stationed within the one just described
to contain two or more slats to be placed across the centre of the frame
except that these are in front and are to be raised a discretionary distance
above horizontal line so that when the hemp or flax first enters at the
front part of the brake the motion of the slats is very small but deepens in
proportion as to the rear so that at the front the stalks are only cracked
but by moving the hemp or flax discretionarily to the rear the breaking
is completely finished.

This frame resembling both in form and motion
a common saw gate except in the front and rear slides which are to
slip in grooves with the main frame and must be able to [illegible] to the
slats two are framed on each end of the several slats; said brake machine
is to receive motion from a crank and pitman and power from men horses
water or steam and to be geared or not according to circumstances the inventor
likewise claims the right of using a fly wheel and any other of a common
kind accordingly the pitman may be attached to the bottom or top of the machine
as the ground may be. The inventor claims the right of varying his machine as to changing the [illegible]

Witness [illegible] William [illegible]
Stephen [illegible]

William Van [illegible]

Recd [illegible]